(12) United States Patent
Kapitany et al.

(10) Patent No.: US 8,699,380 B2
(45) Date of Patent: Apr. 15, 2014

(54) PORT TABLE FLUSHING IN ETHERNET NETWORKS

(75) Inventors: Gábor Kapitany, Budapest (HU); Sándor Plosz, Soponya (HU); Dániel Horvath, Budapest (HU); Richard Pallos, Budapest (HU); János Farkas, Kesckemét (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 92 days.

(21) Appl. No.: 13/146,803

(22) PCT Filed: Jan. 30, 2009

(86) PCT No.: PCT/EP2009/051068
§ 371 (c)(1),
(2), (4) Date: Jul. 28, 2011

(87) PCT Pub. No.: WO2010/086022
PCT Pub. Date: Aug. 5, 2010

(65) Prior Publication Data
US 2011/0292833 A1    Dec. 1, 2011

(51) Int. Cl.
H04L 12/28     (2006.01)
(52) U.S. Cl.
USPC ........................................................... 370/254
(58) Field of Classification Search
USPC ................ 370/216, 222, 241, 242, 254, 228
See application file for complete search history.

(56) References Cited

U.S. PATENT DOCUMENTS

| 6,717,922 | B2* | 4/2004 | Hsu et al. ............... 370/258 |
| 7,876,673 | B2* | 1/2011 | Ram et al. .............. 370/222 |
| 2005/0207348 | A1 | 9/2005 | Tsurumi et al. |
| 2009/0016214 | A1* | 1/2009 | Alluisi et al. .......... 370/228 |
| 2009/0290572 | A1* | 11/2009 | Gonia et al. .......... 370/350 |

FOREIGN PATENT DOCUMENTS

| EP | 1 511 243 | 3/2005 |
| JP | 2006-254341 | 9/2006 |
| WO | WO 03/077459 | 9/2003 |

OTHER PUBLICATIONS

Written Opinion of the International Searching Authority for PCT/EP2009/051068, mailed Mar. 14, 2011.
International Preliminary Report on Patentability for PCT/EP2009/051068, with Amended Sheets, mailed Apr. 20, 2011.

* cited by examiner

*Primary Examiner* — Dang T Ton
*Assistant Examiner* — Kevin Lee
(74) *Attorney, Agent, or Firm* — Nixon & Vandherye, P.C.

(57) ABSTRACT

A method and apparatus for flushing port tables in an Ethernet network that includes a Root Bridge node (1) and a plurality of bridge nodes (2-7). A ring of bridge nodes affected by a change in the topology of the Ethernet network is identified from the plurality of, bridge nodes. The ring of bridge nodes (2-7) includes a branching bridge node (2) providing a connection to the Root Bridge node (1). Port tables are flushed only at the bridge nodes on the ring (2-7), rather than all of the bridge nodes in the Ethernet network, which greatly reduces the amount of signalling required during a relearning process.

20 Claims, 6 Drawing Sheets

PORT TABLE FLUSHING IN ETHERNET NETWORKS

This application is the U.S. national phase of International Application No. PCT/EP2009/051068, filed 30 Jan. 2009, the entire contents of which is hereby incorporated by reference.

TECHNICAL FIELD

The invention relates to the field of flushing port tables in Ethernet networks.

BACKGROUND

Ethernet networks are typically comprised of bridges and point-to-point links that interconnect the bridges. The operation of bridges is defined in IEEE 802.1D-2004 and in IEEE 802.1Q. It is intended that IEEE 802.1D-2004 will be superceded by a new version of IEEE 802.1Q. Whilst the standards use the term "bridges", bridges are sometimes also referred to as switches. Above the physical layer, Ethernet stations and bridges communicate by sending each other data packets as specified in IEEE 802.3. Point-to-point links are applied to interconnect bridges in Local Area Networks (LAN). Ethernet networks are typically controlled by either the Rapid Spanning Tree Protocol or by the Multiple Spanning Tree Protocol as specified in 802.1D-2004 and 802.1Q, respectively.

A bridge uses a Filtering Database (FDB) to direct frames to their destination. The database initially starts off empty, and entries identifying Ethernet stations are added as the bridge learns the location of each station. If a bridge receives a packet that has a destination address that is not in the database, the packet is broadcast to all ports of the bridge and forwarded to all segments in the network. A bridge can populate the database using the source address contained in data packets that traverse the bridge. By comparing the source address with the port at which a frame was received, the bridge can "learn" which addresses belong to stations connected via each port.

Bridges typically use the Rapid Spanning Tree Protocol (RSTP) to prevent the occurrence of loops in the network. A Root Bridge is elected, and all other bridges determine the shortest path to the Root Bridge. This produces a loop free topology where all paths to the Root Bridge are disabled except for the shortest path. All other links that are not part of the Spanning Tree are disabled, and so there is only one path to the Root Bridge. The links that form the Spanning Tree, i.e. kept active by RSTP, form a so-called active topology. The Spanning Tree avoids problems that could otherwise occur if more than one path were used at once. For example, packets could be broadcast between switches and caught in a loop.

Multiple Spanning Tree Protocol (MSTP) allows the creation of separate Spanning Tree Instances for different VLANs, and blocks redundant links in each Spanning Tree Instance independently of each other. RSTP and MSTP are also used for fault handling, as they dynamically reconfigure the active topology in the event of a fault such as a broken link.

RSTP and MSTP control the learning process in Ethernet networks. After a change in network topology, RSTP or MSTP controls the removal of the learnt MAC addresses from the Filtering Database (FDB). The removal process is termed "MAC address flushing". After a MAC address flushing, a re-learning is initiated and the frames are broadcast until the end of the relearning phase, i.e. until the location of stations is learnt again. This is termed a "broadcast storm" due to the increased amount of broadcast messages sent in the network. MAC addresses may also be removed from the FDB due to a "time-out" feature in which, if no frame is received from a particular station for a certain amount of time, then that station is assumed to be disconnected from the network.

A problem with MAC address flushing is that RSTP and MSTP apply a single bit flag (termed the topology change, TC, flag) in Bridge Protocol Data Units (BPDU) to indicate a topology change. A BPDU is a data frame used to exchange information about bridge IDs and root path costs between neighbouring bridges. Use of the TC flag means that it is only possible to indicate that a topology change has occurred, and that the MAC addresses must be flushed.

Both RSTP and MSTP typically remove more entries from the FDB than are normally necessary. This means that more addresses have to be re-learnt during the re-learning, which causes an even larger broadcast storm that places an unnecessary overload on the network. This increases the bandwidth requirements.

SUMMARY

The inventors have realised that it would be desirable to reduce the number of messages sent during re-learning. According to a first aspect of the present invention, there is provided a method of flushing port tables in an Ethernet network. The network includes a Root Bridge node and a plurality of bridge nodes. This identification may be done on the fly. A ring of bridge nodes affected by a change in the topology of the Ethernet network is identified from the plurality of bridge nodes. The ring of bridge nodes includes a branching bridge node providing a connection to the Root Bridge node. Port tables are flushed only at the bridge nodes on the ring, rather than all of the bridge nodes in the Ethernet network. This greatly reduces the amount of signalling required during a relearning process. Note that in the case where the Root Bridge node is part of the ring, then the branching bridge node may be the Root Bridge node itself.

Examples of changes in the Ethernet network topology include a lost bridge, a new link, a new bridge, a plurality of new links and a plurality of new node.

In the case where the change in topology comprises a lost link, the ring of bridge nodes optionally comprises a first portion comprising a path from the lost link to the branching bridge node, and a second portion comprising a path from a newly formed link to the branching bridge node. In this way, port tables are only flushed on bridge nodes affected by a lost link, and not all bridge nodes in the network. As an option, designated port tables are flushed at bridge nodes in the first portion of the ring and root port tables are flushed at bridge nodes on the second portion of the ring. The ring optionally includes a third portion comprising a path between the lost link and the newly formed link. In this case, designated port tables are flushed at bridge nodes in the third portion of the ring.

Control signals are optionally sent to bridge nodes in the ring, the control signals instructing each bridge node to flush port tables. This allows the identification of the ring to occur on the fly in signalling sent between bridge nodes. Note also that the control signalling may instruct a bridge node to only flush selected port tables. As a further option, a bridge node receives a control signal instructing it to flush designated port tables, and after flushing the designated port tables the bridge node forwards the message towards the Root Bridge node. As a further option still, a bridge node on the ring receives a control signal instructing the bridge node to flush root port table, flushes root port tables at the bridge node, forwards the control message towards the Root Bridge node. According to yet a further option, a bridge node on the ring receives a control signal instructing it node to flush designated port tables, and in the event that the bridge node initiated a control signal instructing another bridge node to flush root port table, it takes no action to forward the received control signal towards the Root Bridge node. This prevents unnecessary signalling from being sent.

The method optionally comprises identifying a plurality of rings of bridge nodes and flushing port tables on each bridge node on the plurality of rings.

According to a second aspect of the invention, there is provided a bridge node for use in an Ethernet network. The bridge node is provided with a memory containing a plurality of port tables. A receiver is provided for receiving a signal instructing the bridge node to flush a portion of port tables selected from the plurality of port tables. Only a portion of the port tables need to be flushed, as only other bridges on an identified ring require their port tables to be flushed. A processor is provided for flushing the selected portion of port tables from the memory, and a transmitter is also provided for forwarding the signal to a further bridge node.

As an option, the selected port tables include any of a root port table and a designated port table.

The receiver is optionally arranged to receive a control signal instructing the bridge node to flush designated port tables, and the processor is arranged to determine whether the bridge node has already initiated control signalling instructing another bridge node to flush the root port tables. If such a determination is made, then the received control signal is not forwarded towards the root bridge node. This prevents the sending of unnecessary signalling.

According to a third aspect of the invention, there is provided a method of operating a bridge node in an Ethernet network. A plurality of port tables is stored in a memory. When the bridge node receives a signal instructing the bridge node to flush a portion of port tables selected from the plurality of port tables, it flushes the selected portion of port tables from the memory, and forwards the signal to a further bridge node in the Ethernet network.

According to a fourth aspect of the invention, there is provided a program for controlling an apparatus to perform the method described in the third aspect of the invention.

According to a fifth aspect of the invention, there is provided a program as described in the third aspect of the invention, carried on a carrier medium.

According to a sixth aspect of the invention, there is provided a storage medium containing a program as described in any of the fourth or fifth aspects of the invention.

BRIEF DESCRIPTION OF THE DRAWINGS

In the following, embodiments of the invention will be described in more details by means of figures in which.

DETAILED DESCRIPTION

The invention involves identifying a ring of bridges in an Ethernet network that are affected by a topology change and flushing MAC addresses along the affected ring of bridges. Ring flushing identifies the rings affected by the topology change(s) and invokes MAC address flushing only on the identified rings. This means that only necessary entries are removed from the Filtering Database (FDB) so the transient overload traffic during the re-learning phase is decreased significantly. The removal of the entries along the identified ring topology then initiates the re-learning of those MAC addresses whose availability has changed. By using the ring flushing method, broadcast storms in Ethernet networks caused by changes in the active topology are reduced by deleting only the necessary port tables.

For identifying the port tables that should be flushed in the event of a topology change, a topology change can be thought of as occurring along a ring topology and affecting bridges along this ring topology only. The ring comprises three portions that are handled differently; in case of a link-down event the first portion P1 of the ring is the path between a broken link and the Root Bridge, the second portion P2 is the path between a newly enabled link and the Root Bridge, and the third portion P3 of the ring is the path between the broken link and the newly enabled link. These three portions of the ring can be handled two different ways. As described in more detail below, in the first P1 and third portion P3 of the ring, the learnt addresses are flushed only on ports having a Designated Port role, while on the second portion P2 of the ring only ports having a Root role are flushed. Note that the ring topology along which the topology change is handled is only an arbitrary concept introduced for the handling of changes, as spanning tree protocols block all loops in the network.

Figure 1:
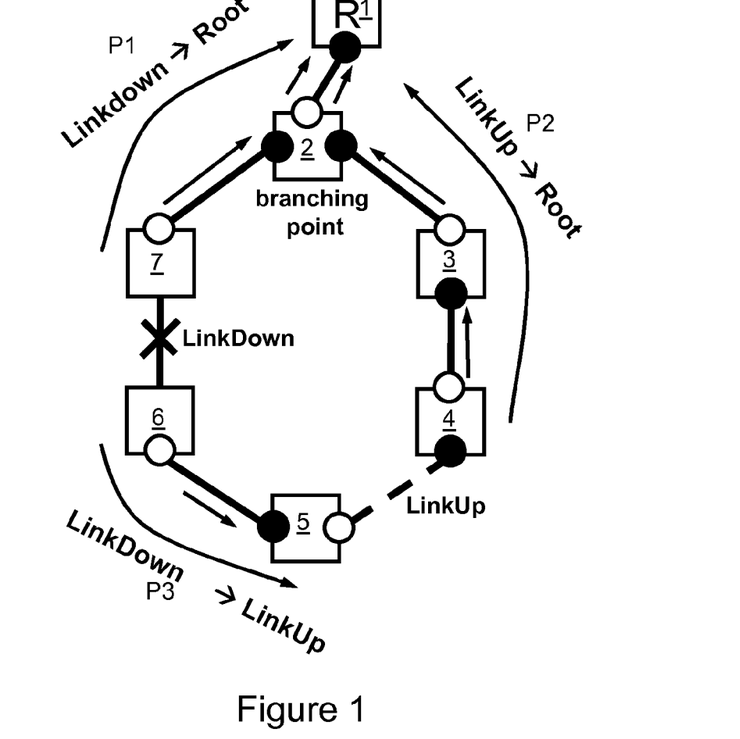
FIG. 1 illustrates schematically in a block diagram a topology change in an Ethernet network.

Assuming that after a topology change the network remains connected, the topology change in the Ethernet network can be considered as a ring having three portions, as illustrated in FIG. 1. The topology change only affects bridges located on the ring, and so those bridges must flush their appropriate ports, which ensures proper frame forwarding in the entire network. The ring comprises a Root Bridge 1 and a plurality of other bridges 2-7. Bridge 2 is connected to the Root Bridge 1 and bridges 2-7 are connected in a ring topology. Port table flushing is needed only on the ring. However, the branching point at bridge 2 towards the Root Bridge 1 cannot be easily located. Therefore, on the path between the branching point and the Root Bridge 1 all the bridges flush their ports unnecessarily.

The first portion P1 of the ring is the path between the bridge detecting the link failure (LinkDown event in the example) and the Root Bridge 1. On this path, nodes (in this example, bridges 2 and 7) have to flush their learnt addresses towards the location of failure since nodes beyond the failed link can be reached via the other direction on the ring. This means that on the first portion of the ring, only Designated Ports need to be flushed.

On the second portion P2 of the ring, including bridges 2, 3 and 4, it can be seen that Root Ports should be flushed on the path from the newly activated link (LinkUp event in the example) to the Root Bridge 1. The position of the newly activated link is determined automatically by determining whether a formerly Discarding port has become a Forwarding port.

The third portion P3 of the ring, including bridges 5 and 6, is similar to the first portion in that those Designated Ports that are formed after the topology change must be flushed.

Note that there are some cases when one or more portions of the ring are missing. For example, the third portion would be missing if a bridge losing its Root Port has an Alternate Port, which is changed immediately into the new Root Port.

Control messages are required in order to flush the FDB entries related to the appropriate ports. Since two different ways are proposed for flushing the ports based on their role (Designated or Root Port flushing), at least two types of message are required. Root Topology Change (RTC) and Designated Topology Change (DTC) notification messages are proposed to control the port flushing. These messages are handled the following way: If a port receives a DTC or an RTC message, then the bridge forwards it on its Root Port (if it exists). If the message is a DTC message, then the filtering entries of the receiver Designated Port are flushed. If the message is a RTC message then the filtering entries of the Root Port are flushed. Table 1 shows a possible implementation of the new messages in RSTP and MSTP BPDUs.

TABLE 1

Topology change flags

| Two-bit flag | | |
|---|---|---|
| TC bit (according to IEEE 802.1Q) RTC bit | TCAck bit (according to IEEE 802.1Q) DTC bit | Meaning |
| 0 | 0 | No topology change |
| 0 | 1 | Designated Topology Change (DTC) |
| 1 | 0 | Root Topology Change (RTC) |
| 1 | 1 | Root & Designated Change (RDTC) |

RTC and DTC messages are triggered by network events. Transitions between RSTP or MSTP port states initiate RTC and DTC messages in the following way: A bridge losing its Forwarding port sends a DTC message on its (new) Root Port and another DTC message must be sent if the new role of the port is Alternate. If a LinkDown occurs, both sides of the link become Discarding, so both bridges (at either side, bridges 6 and 7 in the example shown in FIG. 1) can trigger DTC message sending on their Root Ports. On the other hand, if a link becomes inactive (for a reason other that a link failure, for example if the active topology is reconfigured due to a change in a remote portion of the network) then one of the ports becomes Alternate, while the port on the other end of the link remains Designated. The port that remains Designated is not aware of the topology change and so the transmission of the DTC message is not triggered. The port changing to the Alternate role must trigger the transmission of DTC messages in both directions around the ring. If a port enters a Discarding state (Disabled or Alternate), a DTC message is sent on that port (and also on the Root Port), but a disabled port will not transmit the DTC message, which is the desired operation.

A bridge that has a Discarding port changing to Forwarding sends an RTC message on its (new) Root port.

When a link becomes portion of the active topology, either a new link should appear in the active topology, or a new link should connect two formerly independent physical network segments.

Where a new link appears in the active topology, there are two sub-cases: In the first sub-case, if the link was already a part of the physical topology (so the 'cost' of a port or the priority of a bridge is decreased to form a lower cost path to the Root Bridge), then the port that changed its state from Discarding to Forwarding generates an RTC message on its Root Port. This is performed after the proposal-agreement mechanism has set a port to Discarding state somewhere else in the Ethernet network. Therefore two DTC messages are generated, one to traverses the first portion P1 of the ring and the other to traverse the third portion P3 of the ring. The second sub-case occurs when the link has not been a part of the physical topology. This requires the generation of two RTC messages, because the ports on both ends of the link have changed their states to Forwarding. Nevertheless, both RTC messages traverse the second portion P2 of the ring in a short period of time, so the second RTC message removes only those few entries which are created between the two RTC messages. The transmission of DTC messages is done in the same way as in the first sub-case.

In the case where a new link connects two formerly independent physical network segments, a ring cannot be identified because none of the ports have changed to Discarding state. An RTC message is generated on each side of the new link. These RTC messages traverse the path between the new link and the Root Bridge flushing valid port tables needlessly. On the other hand, one of the former partitions of the network has a new Root Bridge 1 in the other partition, which seldom leaves the topology unchanged, and so TC messages will traverse the same path between the new link and the Root Bridge 1. However, other bridges in the former partition in which the Root Bridge survived will not remove valid port tables, and so the proposed solution is designed for the worst case.

Figure 2:
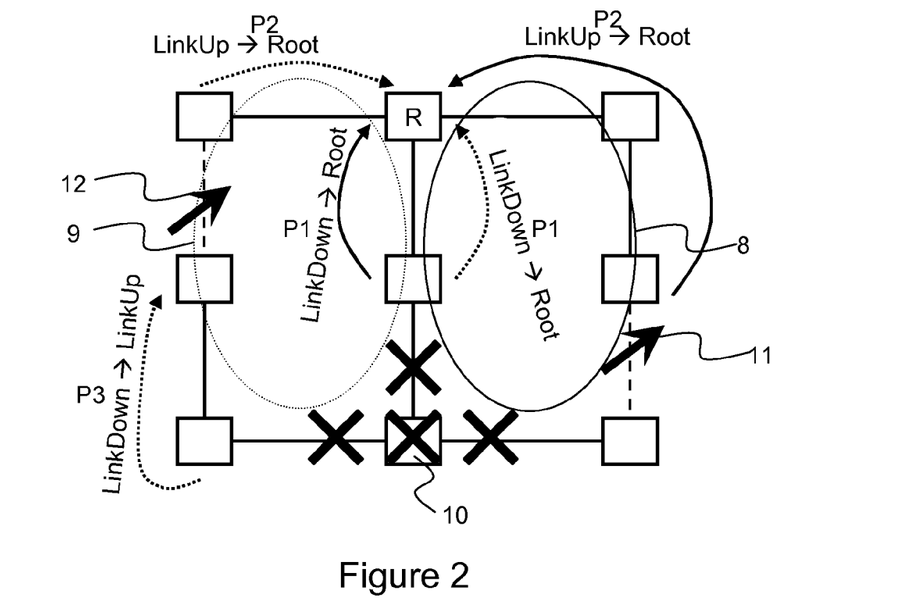
FIG. 2 illustrates schematically in a block diagram an example of a bridge failure in an Ethernet network where two rings can be identified.

The case of a disabled or failed bridge can be treated in the same way as disabled or failed attached links. In this scenario, one or more rings can be identified. In a single ring, instead of a failed link there are two failed neighbouring links, and the three portions of the ring can be identified and treated as a single link failure. If more than one ring can be identified they can be treated independently, as shown in the example of FIG. 2. In FIG. 2, two rings can be identified. The first ring 8 is marked with solid oval, the second ring 9 is marked with dotted oval. The crosses indicate the failure of bridge 10 and the connected links, and arrows 11 and 12 indicate activation of a link.

If the disabled or failed bridge is the Root Bridge 1 then a ring with the new Root Bridge is formed. This does not cause additional problems as the location of the Root Bridge does not affect forwarding.

A received DTC message may be forwarded in the wrong direction owing to the transitional Root Ports during topology change. This may happen where a port temporarily becomes a root port, but ultimately has a different port role. In order to make sure that the DTC message is forwarded to the Root Bridge there are two options: The first option is to apply a timer. When a DTC message is sent, a timer starts. If a new Root Port is elected while this timer is running, sending of another DTC message is necessary. As a result of the proposal-agreement operation, the Root Port role is selected after a transitional Discarding state, which initiates an RTC message. To combine the functionality of the RTC and DTC messages, a Root & Designated Topology Change (RDTC) message is also defined, as shown in Table 1 above. This message can be treated by a receiver bridge as both an RTC and DTC message is received. The second option is to send an RDTC when a Root Port is elected, and so there is no need to apply a timer. The second option is the preferred option.

Figure 3:
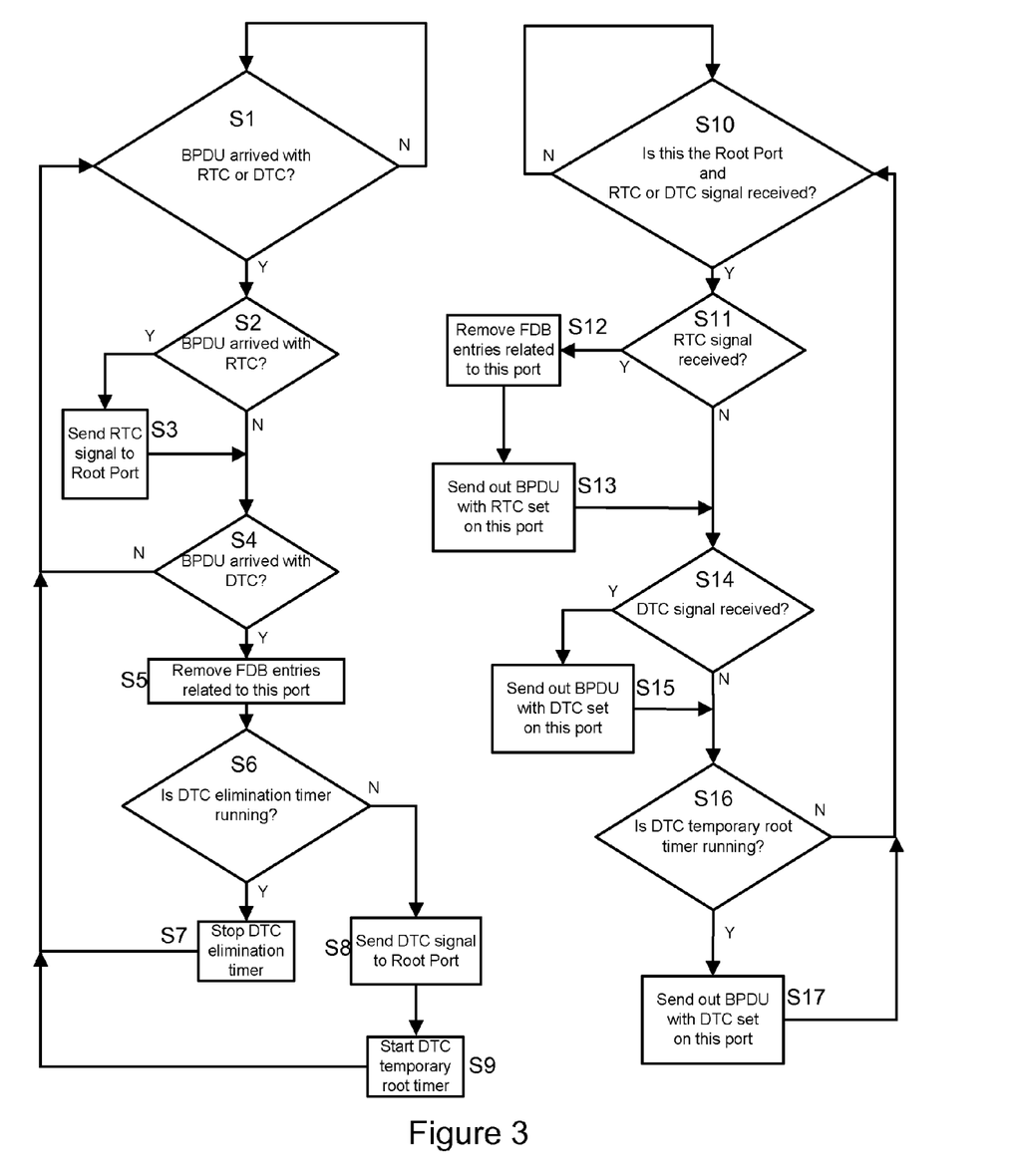
FIG. 3 is a flow diagram illustrating a process followed when a topology occurs according to an embodiment of the invention.

FIG. 3 shows the operation when a BPDU with DTC or RTC is received, with the following numbering corresponding to the numbering of FIG. 3:

S1. A BPDU arrives with an RTC or DTC.

S2. A check is made to see if the BPU includes an RTC.

S3. If the BPU includes an RTC, an RTC signal is sent to the Root Port.

S4. A check is made to see if the BPU includes a DTC.

S5. If the BPU includes a DTC, FDB entries relating to the port are removed.

S6. A check is made to see if a DTC timer is running.

S7. If a DTC timer is running, the DTC elimination timer is stopped.

S8. If the DTC timer is not running, a DTC signal is sent to the Root Port

S9. The DTC temporary root timer is started.

S10. A check is made to see if the port is the Root Port and a RTC or DTC signal is made.

S11. A check is made to see if an RTC signal has been received. If not, go to step S 14.

S12. If an RTC signal has been received, FDB entries relating to the port are removed.

S13. A BPDU is sent out with an RTC set on this port.

S14. A check is made to see if a DTC signal has been received.

S15. If a DTC signal has been received, a BPDU is sent with a DTC set on this port.

S16. A check is made to see whether a DTC temporary root timer is running.

S17. If the DTC temporary root timer is running, a BPDU is sent with DTC set on this port.

Figure 4:
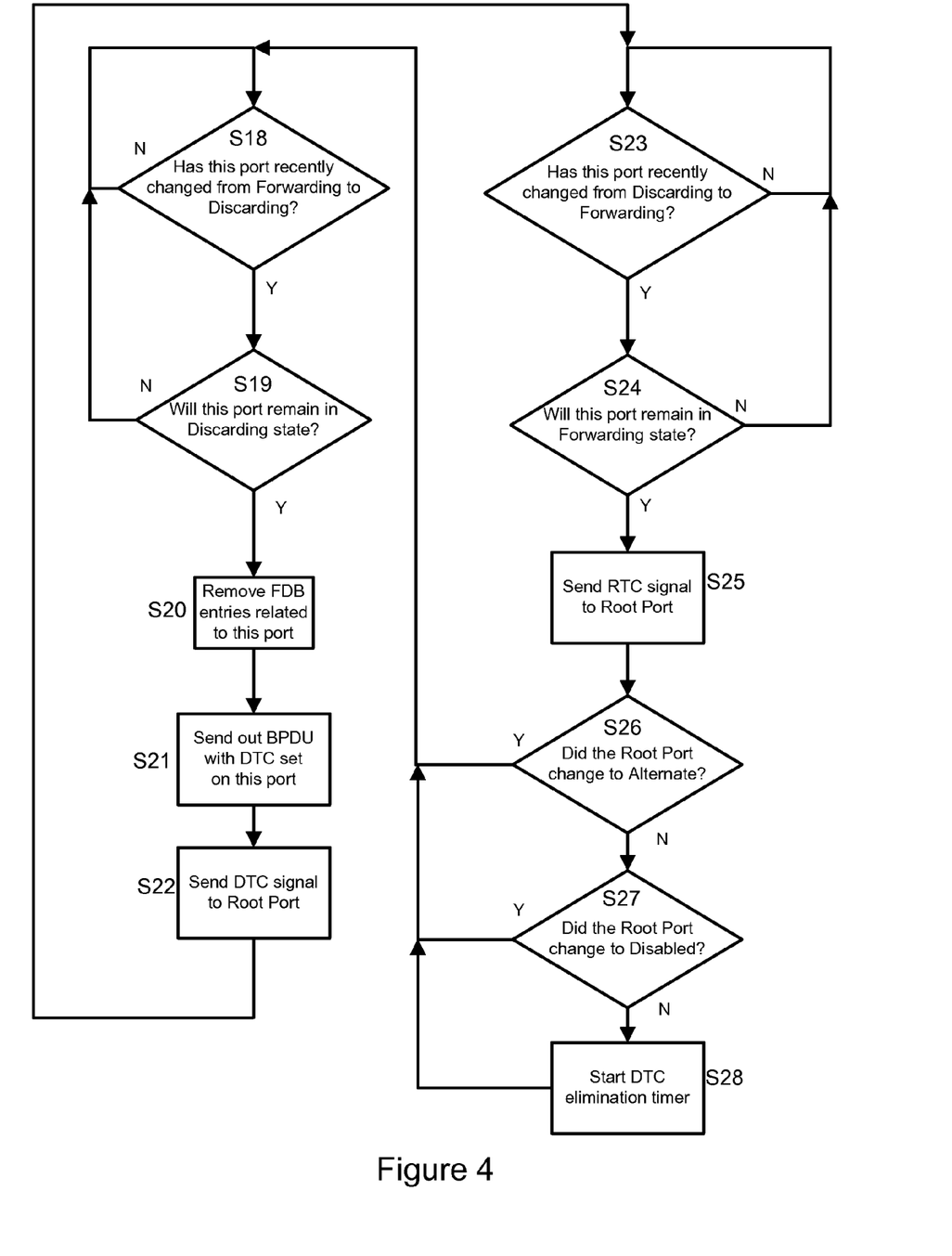
FIG. 4 is a flow diagram illustrating port state changes when a topology occurs according to an embodiment of the invention.

The existing proposal-agreement mechanism temporarily sets some Forwarding ports to the Discarding state. This may happen, for example, if temporary blocks are provided for loop prevention. This would cause a lot of unnecessary TC messages. In an embodiment of the invention these changes are detected and bypassed. A role selection state machine disposed at each bridge iterates before a state transition state machine, and so cases when the port changes to Forwarding state after a transitional Discarding state can be detected, as shown in FIG. 4. The following numbering corresponds to the numbering of FIG. 4:

S18. A check is made to see whether the port has recently changed state from Forwarding to Discarding.

S19. If the port has recently changed state from Forwarding to Discarding, a check is made to see if the port will remain in the Discarding state. If not, then return to S18, and if so then move to S20.

S20. FDB entries relating to this port are moved.

S21. A BPDU with DTC set on this port is sent out.

S22. A DTC signal is sent to the Root Port.

S23. A check is made to see whether the port as recently changed from Discarding to Forwarding. If not, then return to S23, and if so then move to S24.

S24. A check is made to see whether the port will remain in the Forwarding state. If not, then return to step S23, if so then move to step S25.

S25. An RTC signal is sent to the Root Port.

S26. A check is made to see if the Root port has changed to Alternate. If so, then return to step S18.

S27. A check is made to see if the Root port has changed to Disabled. If so, then return to step S18.

S28. The DTC elimination timer is started, and the process returns to S18.

Transient Active Topology

In some circumstances, a transient active topology is formed after the topology change, as shown in FIG. 2. As a result of a LinkDown event, another link is temporarily activated and later another active topology is formed. In case of the formation of a transient topology (or topologies), equal numbers of links are disabled and enabled. This situation can be treated as two (or more) independent topology changes, i.e. considered as two (or more) rings. Note that the physical topology has to be sufficiently redundant to avoid the partitioning of the network in the event that one or more failures occur at some point in the network.

Figure 5:
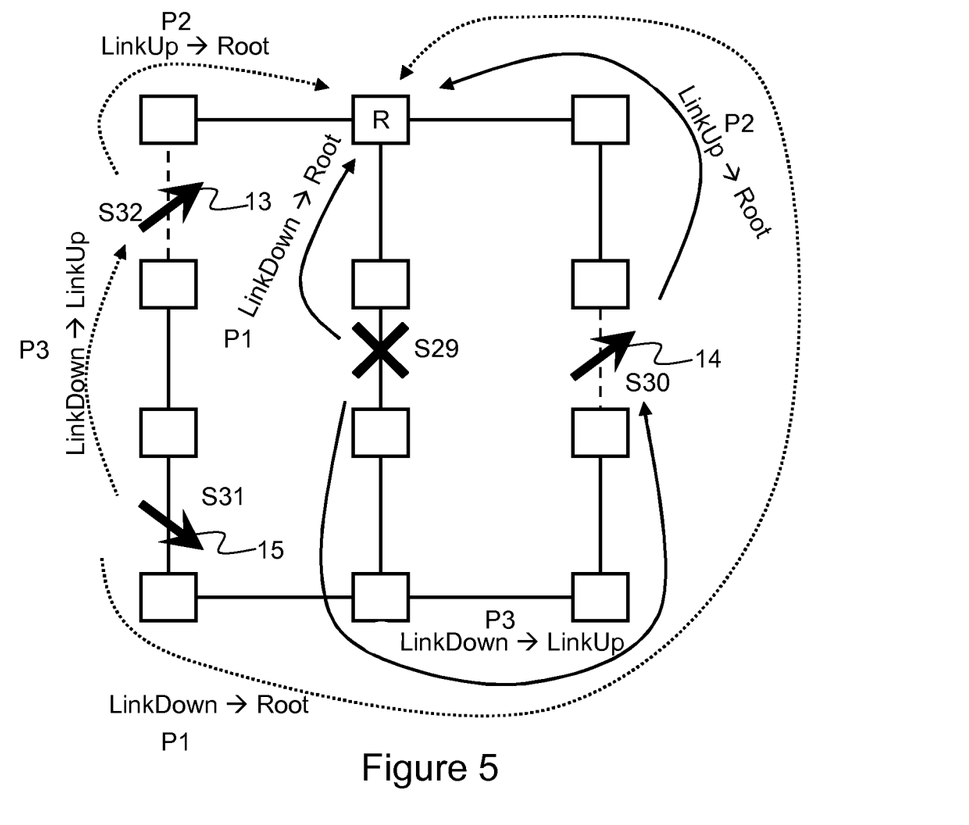
FIG. 5 illustrates schematically in a block diagram an example of a transient topology according to an embodiment of the invention.

FIG. 5 illustrates an example for transient topology. Arrows 13 and 14 indicate the activation of a link, and arrow 15 indicates the blocking of a link. The solid arrows indicate portions of the first ring, whilst the dotted arrows indicate portions of the second ring.

Holding Back Unnecessary Messages

In the event that a transient topology is not formed during the topology change, only one ring can be identified as shown in, for example, FIG. 1. Since the DTC message initiated on the third portion P3 traverses through the second portion P2 it causes unnecessary flushing of port address tables on the second portion P2 of the ring. This event can be avoided by dropping DTC messages on the bridge that has initiated the DTC message. If the third portion P3 of the ring is missing in a scenario, then there is only one DTC message generated on the first portion P1 of the ring.

Dropping a DTC message also means that if a bridge receives an RDTC message then the message is forwarded as an RTC message.

If a transient topology appears in the network, multiple DTC messages can be received by the bridge that transmitted the first RTC message. In this case, only the first received DTC message should be dropped, or the first received RDTC message should be forwarded as an RTC message.

The initiation of an RTC message is immediately executed after the bridge has become aware of the loss of the former path to the Root Bridge. This event can trigger the dropping of the next DTC message. If the third portion P3 of the ring is missing then no DTC message should be dropped, as DTC messages are not generated on the third portion P3 of the ring. This situation can be handled easily because the bridge that has initiated the RTC message is aware of that the failed link.

With this solution, fewer entries are flushed from the port tables and so the broadcast storm diminishes further during the re-learning phase.

Implementation of Ring Flushing Method

Figure 6:
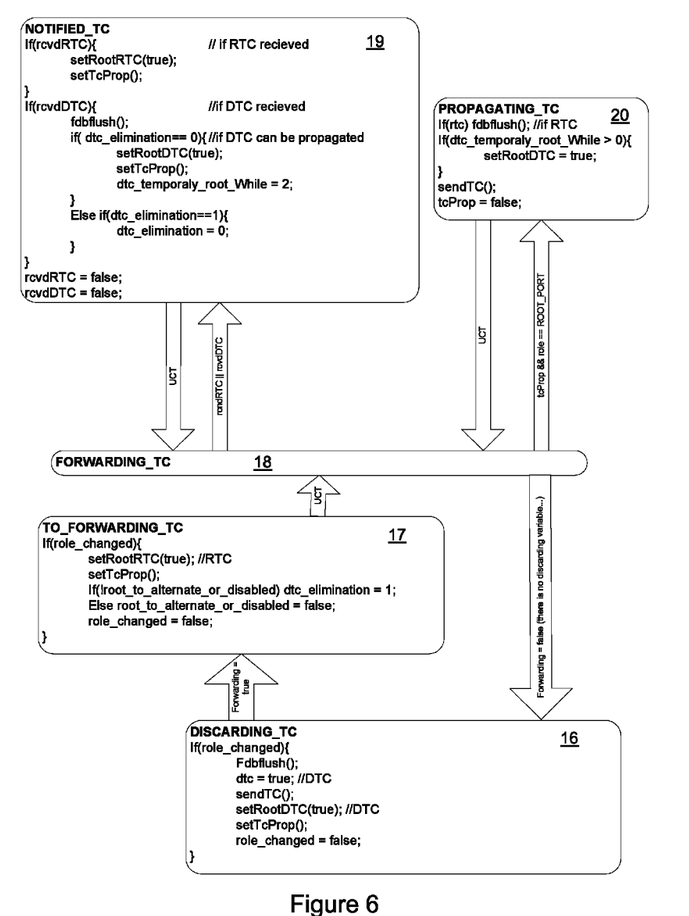
FIG. 6 illustrates a topology change state machine according to an embodiment of the invention.

FIG. 6 shows an example implementation of the proposal using functions described in IEEE 802.1Q 2005, "Provider Virtual Bridged Local Area Networks", and implements the operations illustrated in FIGS. 3 and 4.

The topology change state machine illustrated in FIG. 6 is intended to replace existing topology change state machines. All transitions are triggered by variables. All statements must be executed in a state when entering that state. The acronym UCT in FIG. 6 refers to Unconditional Transition. The operation of the state machine is the same as the state machines in 802.1Q. (Meaning the CPU continuously checks the variables, and tries to transit the state machine.)

This state machine replaces the old Topology Change state machine. The function setTcflags( ) from 802.1Q is altered to include the new RTC and DTC flags. Instead of setting the rcvdTC variable, the rcvdRTC and rcvdDTC "one per tree and per port" variables are present and set according to the arriving BPDU. These variables represent a received RTC or DTC message. The txMstp( ) function from 802.1Q is altered in a similar way. Two local "one per tree and per port" variables are defined: rtc and dtc, and so the txMstp( ) assembles the BPDU flags according to these local variables. After BPDU transmission, these two variables are reset. The tcProp variable is only used for the Root Port, therefore it becomes a "one per bridge" variable. The setTcProp( ) function sets this tcProp true. Two new functions are defined: setRootRTC( ) and setRootDTC( ). These set or reset the rtc and dtc variables of the Root Port respectively. The newTcWhile( ) function which triggers the TC transmission in 802.1Q is replaced by sendTC( ) function. This function sets the newInfo and newInfoMsti variables to trigger a BPDU transmission in the transmission state machine. The tcWhile timer is not used, only one TC message transmitted, which further decreases the Traffic overload after a topology change.

A new variable is defined: dtc_elimination. The dtc_elimination indicates whether a DTC message should be propagated. This variable sets when an RTC message is generated, and the third portion P3 of the ring exists, because the bridge node where RTC message is generated is the same, where the first DTC message should be eliminated. An RTC message is generated when a port changes to the Forwarding State. If a DTC message is received (NOTIFIED_TC state) the dtc_elimination variable is used to decide whether to propagate the DTC message or not. If the DTC message is not propagated, then the variable is reset, because all other DTC messages have to be propagated during the topology change.

For the DTC elimination process, a determination whether the third portion of the ring exists or not is made. If it exists, then the first DTC can be eliminated and the variable is set. For this, the variable root_to_alternate_or_disabled is defined. It has to be set in the updtRolesXstTree( ) function if a Root Port becomes disabled, or set to an alternate port, or is otherwise reset. The third portion 3P of the ring exists if this condition is met, so dtc_elimination is set according to the value of this variable.

The dtc_temporaly_root timer handles transient Root Port roles. As an example, there is a possibility that after a topology change, a bridge has a temporary Root Port. There is a chance that a DTC message may be received during the time when the temporary Root Port is present, in which case the DTC message will be propagated in the wrong direction. The timer starts at the first DTC message propagation in a bridge, and runs for a predetermined period of time, for example two seconds. If a new Root Port is elected, an RTC message is transmitted. While the timer is running, an RDTC message is transmitted instead of an RTC message, to ensure that the DTC is transmitted in the right direction.

There is a possibility that during a topology change, Forwarding-Discarding-Forwarding transient behaviour is present. This occurs when, for example, a Designated Port remains Designated. The "one per tree and per role" variable role_changed is defined to prevent this. In the role selection (updtRoleXstTree( ) function), the role_changed variable is set if a port has a new role, which will have new state. For example, if an Alternate Port is elected as the Root Port, then Discarding becomes Forwarding. If the port has a new role but remains in same state, for example if the Root Port becomes a Designated Port and therefore remains in a Forwarding state after a transient Discarding state, then the variable is reset. Furthermore, if the port is designated the same role as before, the variable is reset. In the event that the port has changed state to a Forwarding or Discarding State, it only has to trigger events if the role_changed variable is set for that port. Furthermore, after the event has been triggered, the role_changed variable must be reset.

The example state machine has the following functions added:
setRootRTC( )
setRootDTC( )
sendTC( )
The example state machine has the following functions changed:
setTcflags( )
txMstp( )
setTcProp( )—also has been renamed from setTcPropTree( )
updtRolesXstTree( )
The example state machine has the following functions removed:
newTcWhile( )
The example state machine has the following variables added:
rcvdRTC
rcvdDTC
rtc
dtc
dtc_elimination
root_to_alternate_or_disabled
dtc_temporaly_root
role_changed
The example state machine has changed the usage of the following variables:
tcProp
newInfo
newInfoMsti
The example state machine has removed the following variables:
rcvdTC
tcWhile
The states shown in FIG. 6 have the following meanings:
Discarding_TC 16: These steps are invoked when a port enters the Discarding state.
To_Forwarding_TC 17: This block runs when the port transits to Forwarding state from Discarding state. This transition is differentiated from a continuous Forwarding state.
Forwarding_TC 18: This state is the idle operation of a Forwarding Port, and so is used when the port is continuously in Forwarding state.
Notified_TC 19: The interpretation of the received RTC or DTC BPDU is implemented here.
Propagating_TC 20: Only Root Ports enter this block, which implements the RTC or DTC message propagation.

Figure 7:
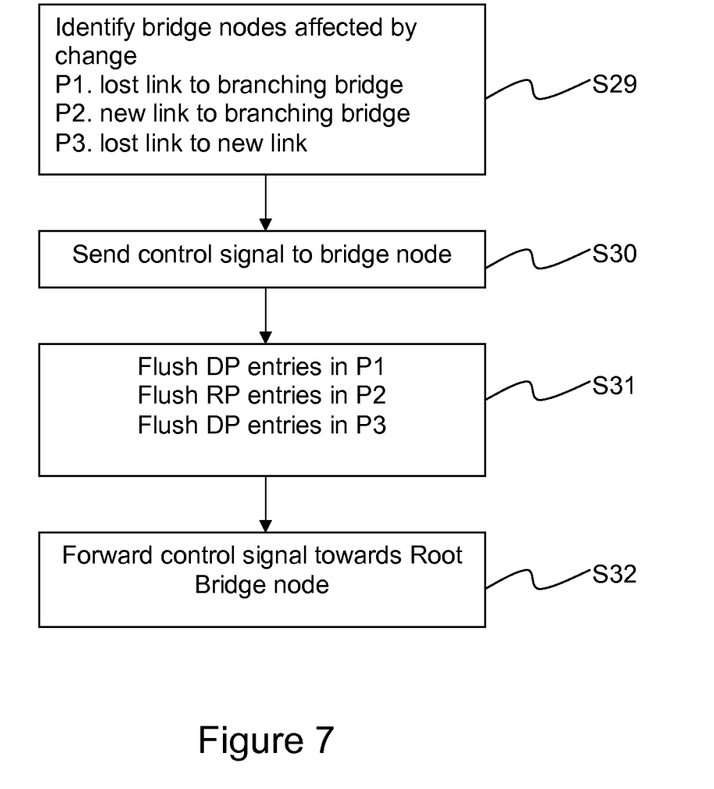
FIG. 7 is a flow chart showing steps of an embodiment of the invention.

The flow chart of FIG. 7 shows the steps according to an embodiment of the invention. The following numbering corresponds to the numbering of FIG. 7.

S29. The bridge nodes affected by a topology change in the network are identified. In this example, the network change is a lost link, in which a ring of bridge nodes has a first portion P1 defining a path from the lost link to the branching bridge node 2 and a second portion P2 defining a path from the newly formed link to the branching bridge node 2. A third portion P3 may also be included, defining a path between the lost link and the newly formed link.

S30. A control signal is sent to a bridge node instructing it to flush defined port tables.

S31. The bridge node receiving the control signal flushes Designated Port tables in P1 and Root Port tables in P2 and, if necessary, Designated Port tables in P3.

S32. If necessary, the control signal is forwarded towards the next bridge node on the path to the Root Bridge node.

Note that the above is a simplification of the invention, and should not imply that a separate determination of a ring is made. Identification of a ring typically occurs "on the fly" during the signalling between bridge nodes and when the control signals are processed.

Figure 8:
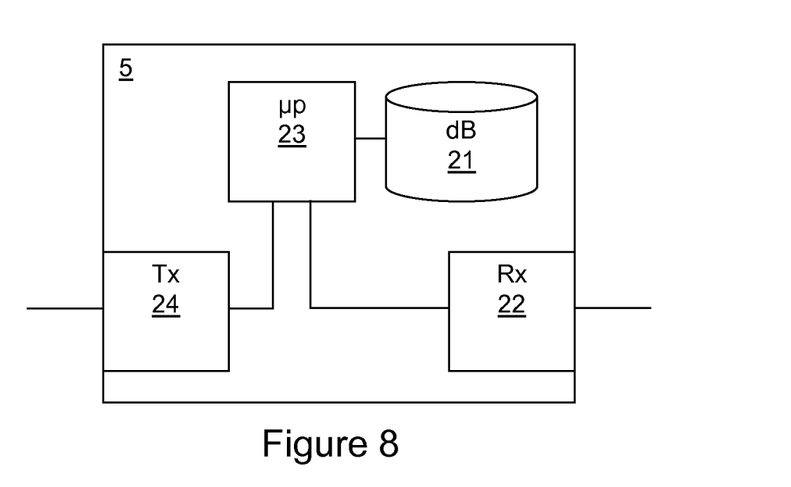
FIG. 8 illustrates schematically in a block diagram a bridge node according to an embodiment of the invention.

Referring to FIG. 8, a bridge node is illustrated. The bridge node 5 has a memory 21 to store port tables and a receiver 22 for receiving a signal instructing the bridge node 5 to flush at least some of the port tables. A processor 23 is provided for flushing the required port tables, and a transmitter 24 is provided for forwarding the signal to a further bridge node on the ring. The memory 21 stores MAC address and port association entries, which are specially organized in the memory such that the entries associated to a specific port are collected together in a subtable of the memory, which is referred to as a port table. It is beneficial to structure the FDB such a way that entries belonging to a port are collected in, for example, a sub-table in order to ease flushing of the entries belonging to a port. During normal operation, when a frame arrives the table look-up is performed based on the destination address and the result of the look-up is the port(s) on which the frame has to be sent out. The entries belonging to a port may be stored together in the same part of the table. Note that the memory 21, receiver 22, processor 23 and transmitter 24 may all have additional functions to the ones described above.

Existing RSTP and MSTP flushing processes unnecessarily remove entries from the FDB after a topology change, thereby causing unnecessarily large overload traffic for the bridge network during the broadcast storm. The Ring Flushing method proposed herein reduces the traffic overload after a topology change by reducing the number of messages sent to initiate flushing of MAC address entries. This is controlled by a new two-bit topology change flag of BPDUs.

It will be appreciated by a person of skill in the art that various modifications may be made to the embodiments described above without departing from the scope of the present invention as defined by the claims.

The following acronyms are used in this description:

| | |
|---|---|
| BPDU | Bridge Protocol Data Unit |
| DTC | Designated Topology Change |
| FDB | Filtering Database |
| MAC | Medium Access Control |
| MSTP | Multiple Spanning Tree Protocol |
| RSTP | Rapid Spanning Tree Protocol |
| RDTC | Root & Designated Topology Change |
| RTC | Root Topology Change |
| TC | Topology Change |

The invention claimed is:

1. A method of flushing port tables at bridge nodes in an Ethernet network, the Ethernet network comprising a Root Bridge node and a plurality of bridge nodes each of the plurality of bridge nodes having a plurality of ports and one or more port tables associated with each of the plurality of ports, the method comprising:
identifying on the fly, from the plurality of bridge nodes, a ring of bridge nodes affected by a change in the topology of the Ethernet network, the ring of bridge nodes comprising a subset of the plurality of bridge nodes and including a branching bridge node providing a connection to the Root Bridge node determined according to a spanning tree protocol;
flushing port tables only on the bridge nodes on the ring;
sending control signals to bridge nodes in the ring, the control signals instructing each bridge node to flush port tables; and
configuring said control signals to instruct each bridge node to flush only root port tables or only designated port tables as indicated in a received one of the control signals.

2. The method according to claim 1, wherein the change in the topology is selected from any of a lost bridge, a new link, a new bridge, a plurality of new links and a plurality of new node.

3. The method according to claim 1 wherein the change in topology comprises a lost link, and the identified ring of bridge nodes comprises a first portion comprising a path from the lost link to the branching bridge node, and a second portion comprising a path from a newly formed link to the branching bridge node.

4. The method according to claim 3, comprising:
flushing designated port tables at bridge nodes in the first portion of the ring; and
flushing root port tables at bridge nodes on the second portion of the ring.

5. The method according to claim 3, wherein the ring comprises a third portion comprising a path between the lost link and the newly formed link, the method comprising flushing designated port tables at bridge nodes in the third portion of the ring.

6. The method according to claim 1, further comprising, at a bridge node on the ring:
receiving a control signal instructing the bridge node to flush designated port table;
flushing designated port tables at the bridge node; and
forwarding the control signal towards the Root Bridge node.

7. The method according to claim 1, further comprising, at a bridge node on the ring:
receiving a control signal instructing the bridge node to flush root port table;
flushing root port tables at the bridge node; and
forwarding the control signal towards the Root Bridge node.

8. The method according to claim 1, further comprising, at a bridge node on the ring:
receiving a control signal instructing the bridge node to flush designated port tables; and
in the event that the bridge node initiated a control signal instructing another bridge node to flush root port table, taking no action to forward the received control signal towards the Root Bridge node.

9. The method according to claim 1, comprising identifying a plurality of rings of bridge nodes and flushing port tables on each bridge node on the plurality of rings.

10. The bridge node according to claim 1, wherein the processor is further configured to determine whether the bridge node is on the first path or the second path based upon the received signal.

11. The method according to claim 1, wherein the identifying on the fly comprises:
identifying the ring based upon control messages generated by bridge nodes that respectively have at least one port transition between states in response to the change in the topology, wherein the generated control messages are forwarded towards the Root Bridge node.

12. The method according to claim 11, wherein ring includes only bridge nodes that generated or forwarded at least one of the control messages.

13. The method according to claim 1, wherein the identifying on the fly is performed in response to the change in the topology.

14. The method of claim 1, wherein the ring includes one or more bridge nodes on a first path from a location of a network failure to the Root Bridge node and one or more bridge nodes on a second path from a location of a newly-enabled link to the Root Bridge node.

15. A bridge node for use in an Ethernet network, the bridge node comprising:
   a memory containing a plurality of port tables, each port of the bridge node having associated with it at least one of the plurality of port tables;
   a receiver for receiving a signal instructing the bridge node to flush a portion of port tables selected from the plurality of port tables;
   a processor for flushing the selected portion of port tables from the memory; and
   a transmitter for forwarding the signal to a further bridge node in a direction of a Root Bridge node, wherein the Root Bridge node is determined based upon a spanning tree protocol, wherein the processor is configured to identify the selected portion of port tables such that the selected portion is different based upon at least whether the bridge node is on a first path from a location of a network failure to the Root Bridge node or whether the bridge node is on a second path from a location of a newly-enabled link to the Root Bridge node.

16. The bridge node according to claim 15, wherein the selected port tables include any of a root port table and a designated port table.

17. The bridge node according to claim 15, wherein the receiver is arranged to receive a control signal instructing the bridge node to flush designated port tables; and
   the processor is arranged to determine whether the bridge node initiated control signal instructing another bridge node to flush the root port tables and, in the event that such a determination is made, to ensure that the received control signal is not forwarded towards the Root Bridge node.

18. A method of operating a bridge node in an Ethernet network, the method comprising:
   storing a plurality of port tables in a memory, each port of the bridge node having associated with it at least one of the plurality of port tables;
   receiving a signal instructing the bridge node to flush a portion of port tables selected from the plurality of port tables;
   flushing the selected portion of port tables from the memory; and
   forwarding the signal to a further bridge node in the Ethernet network in a direction of a Root Bridge node, wherein the Root Bridge node is determined based upon a spanning tree protocol,
   the method further comprising identifying the selected portion of port tables such that the selected portion is different based upon at least whether the bridge node is on a first path from a location of a network failure to the Root Bridge node or whether the bridge node is on a second path from a location of a newly-enabled link to the Root Bridge node.

19. A non-transitory computer readable storage medium having stored thereon instructions, that when executed by a processor in a bridge node in an Ethernet network, causes the processor to:
   store a plurality of port tables in a memory, each port of the bridge node having associated with it at least one of the plurality of port tables;
   receive a signal instructing the bridge node to flush a portion of port tables selected from the plurality of port tables;
   flush the selected portion of port tables from the memory; and
   forward the signal to a further bridge node in the Ethernet network in a direction of a Root Bridge node, wherein the Root Bridge node is determined based upon a spanning tree protocol,
   wherein the instructions further cause the processor to identify the selected portion of port tables such that the selected portion is different based upon at least whether the bridge node is on a first path from a location of a network failure to the Root Bridge node or whether the bridge node is on a second path from a location of a newly-enabled link to the Root Bridge node.

20. A non-transitory computer readable storage medium having stored thereon instructions, that when executed by a processor in a bridge node in an Ethernet network, causes the processor to:
   identify on the fly, from a plurality of bridge nodes in the Ethernet network each of the plurality of bridge nodes having a plurality of ports and one or more port tables associated with each of the plurality of ports, a ring of bridge nodes affected by a change in the topology of the Ethernet network, the ring of bridge nodes comprising a subset of the plurality of bridge nodes and including a branching bridge node providing a connection to a Root Bridge node determined according to a spanning tree protocol;
   flush port tables only on the bridge nodes on the ring;
   sending control signals to bridge nodes in the ring, the control signals instructing each bridge node to flush port tables; and
   configuring said control signals to instruct each bridge node to flush only root port tables or only designated port tables as indicated in a received one of the control signals.

* * * * *

UNITED STATES PATENT AND TRADEMARK OFFICE
CERTIFICATE OF CORRECTION

PATENT NO.        : 8,699,380 B2                                    Page 1 of 1
APPLICATION NO.   : 13/146803
DATED             : April 15, 2014
INVENTOR(S)       : Kapitany et al.

It is certified that error appears in the above-identified patent and that said Letters Patent is hereby corrected as shown below:

On the Title Page, Item (74), under "Attorney, Agent, or Firm", in Column 2, Line 1, delete "Vandherye," and insert -- Vanderhye, --, therefor.

Signed and Sealed this
Sixteenth Day of September, 2014

Michelle K. Lee
*Deputy Director of the United States Patent and Trademark Office*